United States Patent
Challener et al.

(10) Patent No.: US 6,823,463 B1
(45) Date of Patent: Nov. 23, 2004

(54) METHOD FOR PROVIDING SECURITY TO A COMPUTER ON A COMPUTER NETWORK

(75) Inventors: David Carroll Challener, Raleigh, NC (US); Richard Alan Dayan, Wake Forest, NC (US); Palmer Eugene Newman, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/571,192

(22) Filed: May 16, 2000

(51) Int. Cl.[7] .......................... G06F 11/30; G06F 12/14; G06F 15/177

(52) U.S. Cl. ....................... 713/202; 713/100; 713/200; 713/201; 709/217; 709/219; 709/220; 709/221; 709/222

(58) Field of Search ............................... 713/200, 201, 713/202, 100; 709/217, 219, 220, 221, 222, 223, 225

(56) References Cited

U.S. PATENT DOCUMENTS

| | | | |
|---|---|---|---|
| 5,287,519 A | | 2/1994 | Dayan et al. ................ 713/202 |
| 5,341,422 A | | 8/1994 | Blackledge et al. ......... 713/201 |
| 5,432,939 A | | 7/1995 | Blackledge et al. ......... 713/200 |
| 5,574,786 A | | 11/1996 | Dayan et al. ................ 713/202 |
| 5,671,414 A | * | 9/1997 | Nicolet ....................... 709/328 |
| 5,708,777 A | * | 1/1998 | Sloan et al. ................. 713/202 |
| 5,742,758 A | | 4/1998 | Dunham et al. ............. 713/200 |
| 5,774,058 A | * | 6/1998 | Henry et al. ................. 340/5.5 |
| 5,774,879 A | * | 6/1998 | Custy et al. .................. 705/35 |
| 5,826,015 A | * | 10/1998 | Schmidt ...................... 713/201 |
| 5,908,469 A | * | 6/1999 | Botz et al. ................... 713/201 |
| 6,101,608 A | * | 8/2000 | Schmidt et al. ............. 713/202 |
| 6,108,782 A | * | 8/2000 | Fletcher et al. ............. 713/153 |
| 6,496,858 B1 | * | 12/2002 | Frailong et al. ............ 709/221 |

* cited by examiner

*Primary Examiner*—Emmanuel L. Moise
(74) *Attorney, Agent, or Firm*—George E. Grosser; Dillon & Yudell LLP

(57) ABSTRACT

A method for providing security to a computer on a computer network is disclosed. When a network-supplied privileged-access password (PAP) is encountered during a system boot-up operation of the computer, the network-supplied PAP is compared with a system-installed PAP. The network-supplied PAP is stored in a first location of a non-volatile memory of the computer, and the system-installed PAP is stored in a second location of the non-volatile memory of the computer. The system-installed PAP is previously entered to the computer via a keyboard of the computer. If the network-supplied PAP does not match the system-installed PAP, a tamper evident mechanism within the computer is set. Otherwise, if the network-supplied PAP matches the system-installed PAP, the boot-up operation continues to be performed. After the boot-up operation has been completed, configuration of the computer is allowed to be performed remotely over the computer network.

14 Claims, 4 Drawing Sheets

METHOD FOR PROVIDING SECURITY TO A COMPUTER ON A COMPUTER NETWORK

BACKGROUND OF THE INVENTION

1. Technical Field

The present invention relates to a method and system for data processing in general, and in particular to a method and system for providing system security on a computer. Still more particularly, the present invention relates to a method for providing security to a computer on a computer network such that remote configuration of the computer can be allowed.

2. Description of the Prior Art

Generally speaking, personal computers can be connected together to form computer networks in many ways and through the use of various schemes. In some computer networks, personal computers are used essentially as "dumb" terminals to communicate with a more powerful host computer XO typically known as a mainframe that serves to provide large databases and as the location of residence of applications programs. In other computer networks, personal computers are used as "smart" terminals that obtain application programs and sometimes data from a central file server (which may be another personal computer equipped with a direct access storage device of large capacity and capable of operating at relatively quick data recovery speeds), manipulate or receive entry of data, and return data to the file server. In still other computer networks, a group of personal computers may share among group resources, including peripheral devices such as printers, scanners, modems, etc., available to one or more of the personal computers within the computer network, and application program or data files located on various direct access storage devices each of which is more directly associated with a single one of the resource sharing personal computers. This type of computer network arrangements are typically known as a local-area network (LAN).

Although computer networks allow software updates and asset management to be performed in a more efficient manner, one area that has not benefitted from the computer networks is configuration management. Part of the problem preventing remote configuration updates to individual computers within a computer network is the fact that some updates require physical actions. These updates include adding an adapter card to an I/O channel or installing additional memories to a local memory bus. However, other configuration actions, such as changing DMA channel usage, assigning I/O address spaces, or assigning interrupt levels, could be performed at a remote network management point. The only problem is that the security of the computer network may be compromised if the configuration of a personal computer within the computer network is allowed to be changed remotely without any restriction. The present disclosure provides a method for ensuring network security before any remote configuration on a personal computer within a computer network is allowed.

SUMMARY OF THE INVENTION

The present invention provides security to a computer on a computer network for allowing remote configuration of the computer. In accordance with a preferred embodiment of the present invention, when a network-supplied privileged-access password (PAP) is encountered during a system boot-up operation of the computer, the network-supplied PAP is compared with a system-installed PAP. The network-supplied PAP is stored in a first location of a non-volatile memory of the computer, and the system-installed PAP is stored in a second location of the non-volatile memory of the computer. The system-installed PAP is previously entered to the computer via a keyboard of the computer. If the network-supplied PAP does not match the system-installed PAP, a tamper evident mechanism within the computer is set. Otherwise, if the network-supplied PAP matches the system-installed PAP, the boot-up operation continues to be performed. After the boot-up operation has been completed, configuration of the computer is allowed to be performed remotely over the computer network.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
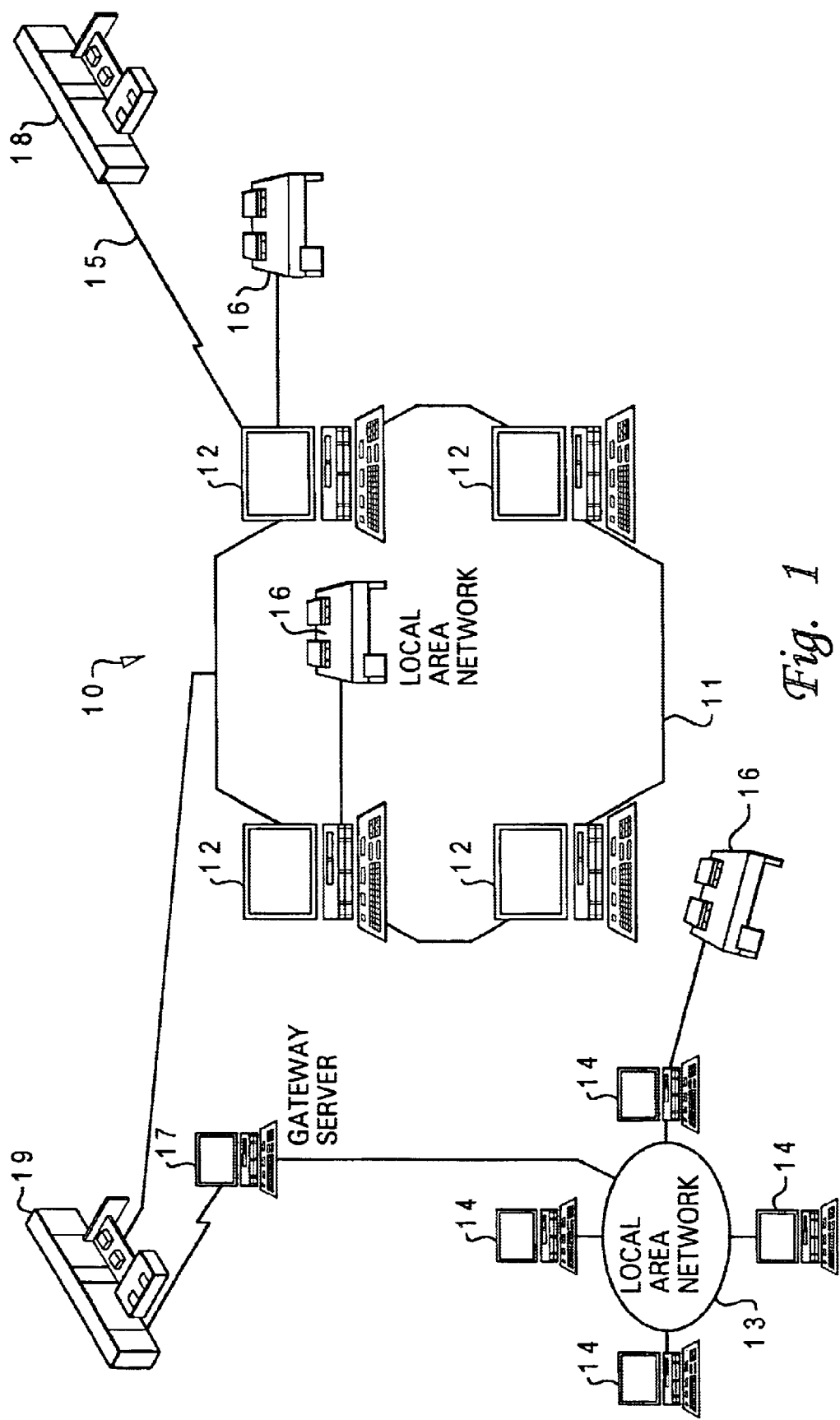
FIG. 1 is a pictorial representation of a computer network in which preferred embodiment of the present invention is implemented.

The present invention may be applicable to a variety of distributed computing networks, such as a local-area network (LAN) or a wide-area network (WAN), under a number of different operating systems. The computers within the distributed computing networks may be personal computers, mid-range computers, or mainframe computers.

I. Overview

With the present invention, security of a personal computer system connected to a computer network is ensured before the personal computer system can be remotely configured over the computer network. A personal computer system is protected by two different passwords, namely, a Privileged-Access Password (PAP), and a Power-On Password (POP). These two passwords are intended to be used independently of one another. The POP is used to prevent any unauthorized access to the personal computer system. The PAP is designed to provide additional protection for a system owner from any unauthorized access to the personal computer system by protecting any access to the IPL device boot list, the password utility, and the System Reference Diskette image. The existence of the PAP is transparent to a normal user using the POP. The PAP can be installed, changed, or deleted by a utility on the System Reference Diskette image. The PAP, when set and entered correctly, gives a user full access to the entire computer system, overriding the POP.

In order to facilitate the explanation of the present invention, certain terms are defined as follows:

System Owner: A system owner is an authorized user or a normal user who is responsible for configuring and placing a personal computer system in a secured mode. The system owner controls system configuration both initially and whenever a configuration update needs to be made. The system owner also controls a PAP and is responsible for maintaining the integrity of the PAP. The system owner maintains physical security of the tamper evident cover keylock key. The system owner is responsible for maintaining security logs on the personal computer system. The system owner has to record all attempted security breaches. The system owner may own more than one personal computer system.

Authorized User: Any user who is given permission to use the PAP. This person may or may not be the system owner. This person may also have a key for a particular personal computer system or a set of personal computer systems. If this person is involved in recovering a personal computer system from a security breach, this person is also responsible for reporting the security breach to the system owner. An authorized user may also be a normal user.

Normal User: Any user of a personal computer system authorized to use the system facilities. In order to change the configuration or fix a problem of a personal computer system, a normal user requires the assistance of either the system owner or an authorized user. A normal user does not have the PAP or the tamper evident cover keylock key unless the normal user is also an authorized user or a system owner.

Unauthorized User: An unauthorized user is a person that is not defined as a system owner, an authorized user. Other than an unsuccessful power on, any use of a secured personal computer system by an unauthorized user is considered a security breach and an audit trail must exist showing such breaches.

Secur Mod: When a system owner has successfully installed a PAP on a personal computer system to invoke security protection provided by the security and integrity elements.

EEPROM: EEPROM is an acronym for an Electrically Erasable Programmable Read Only Memory. This type of memory technology provides for non-volatile storage of data that can be changed under control of hardware logic. Contents stored within an EEPROM remains intact even when power is absent. Contents stored within an EEPROM can be altered only when appropriate controls signals on the EEPROM are activated in the predefined sequence.

In order to enable a remote configuration over a computer network, a personal computer system within a secured computer network must be able to accept a PAP, able to perform system power-off upon the receipt of a network command, and able to provide a self power-up based on time (such as using an interval timer or an alarm based on time-of-day clock), a modern with a ring indicate or based on a LAN message received mechanism (such as using a LAN adapter having a wake-up on LAN capability). Most personal computer systems, including all personal computer systems that are manufactured by International Business Machines (IBM) Corporation of Armonk, N.Y., and other computer systems that are so-called IBM Compatible, contain a device known as a Real Time Clock (RTC). The RTC includes a clock, an alarm clock, and a battery backed-up storage. The alarm clock supplied in the RTC can be used to power up a computer system with the correct hardware connections from the RTC to the power supply. Similarly, an interval timer, a ring indicate detection, or a LAN wake-up message received can be provided with an external hardware logic to provide the same power-on capability as the alarm clock.

Referring now to the drawings and in particular to FIG. 1, there is depicted a pictorial representation of a computer network in which preferred embodiment of the present invention is implemented. As shown, a computer network 10 includes several local-area networks (LANs), such as LANs 11 and 13, each of which includes multiple computers 12 and 14, respectively. Some or all of computers 12, 14 are personal computer systems. In addition, each of computers 12 and 14 preferably includes a EEPROM (not shown). Some of computers 12, 14 may be connected to an output device such as a printer 16.

In addition, computer network 10 may also include several mainframe computers, such as a mainframe computer 18 and a mainframe computer 19. Mainframe computer 18 is coupled to LAN 11 by means of communications link 15. LAN 13 is coupled to LAN 11 via a gateway server 17 and mainframe computer 19 that serves as a communications controller.

II. Privileged Access Password (PAP) Description

As mentioned previously, a PAP is designed to provide system security for a system owner of the personal computer by protecting any access to an IPL device boot list, to a password utility, and to a System Reference Diskette Image on a System Reference Diskette or in a system partition of a hard drive. Booting the System Reference Diskette Image in the system partition of the hard disk is commonly referred to as booting the system partition. The system partition will be booted in response to a Power-on Self Test (POST) error only if there is no PAP installed, if the PAP was entered initially during the power-on sequence, or if the PAP was entered via a network entry procedure to be described below. Initial BIOS Load (IBL) from a diskette drive will not be allowed when the PAP is entered via the PAP network entry procedure unless the diskette drive is included in the IPL device boot list. Also, PAP maintenance operations will not be allowed when the PAP is entered via the network entry procedure.

The PAP can only be installed, changed, or deleted by a software utility on the System Reference Diskette Image when manually entered via the keyboard of a personal computer system. In order to be able to enter the PAP via a computer network, a personal computer is preferably provided with a non-volatile memory for the storage of a network-supplied PAP; a read/write protection mechanism for the area within the non-volatile memory in which the network-supplied PAP is stored; a self power-off capability in the personal computer system; a self power-up capability based on at least one of the following: a specified time period, a timer, an alarm, a wake-up on ring indication, or a wake-up on LAN message received; at least one byte in the non-volatile memory to contain a locking mechanism identity field that contains information identifying the desired locking mechanisms to be left unlocked at the completion of POST at the next power-on from a power-off state; and a read only protection mechanism for the non-volatile memory that contains the locking mechanism identity field.

Preferably, the non-volatile memory is an EEPROM contained within each personal computer system. In addition, the locking mechanism identity field includes multiple bits, and each of the bits represents a different area of the personal computer to which a locking mechanism can be applied. For example, a first bit of the locking mechanism identity field may represent a first area within the EEPROM, a second bit of the locking mechanism identity field may represent a second area within the EEPROM, a third bit of the locking mechanism identity field may represent a boot list area, etc. If a certain bit within the locking mechanism identity field is set (i.e., a logical "1"), then the corresponding area is to be left unlocked at the completion of POST at the next power-on from a power-off state if the network-supplied PAP matches the system-installed PAP. Once activated, the read/write protection mechanism can only be reset by powering off the personal computer system.

III. Client Services Software

As a preferred embodiment of the present invention, client services software is a small application software utility or a network device driver that has been modified to recognize a network message that is sent by a network server to a personal computer system within a computer network. In addition, the network message preferably contains a network-supplied PAP and a locking mechanism identity field.

Figure 2:
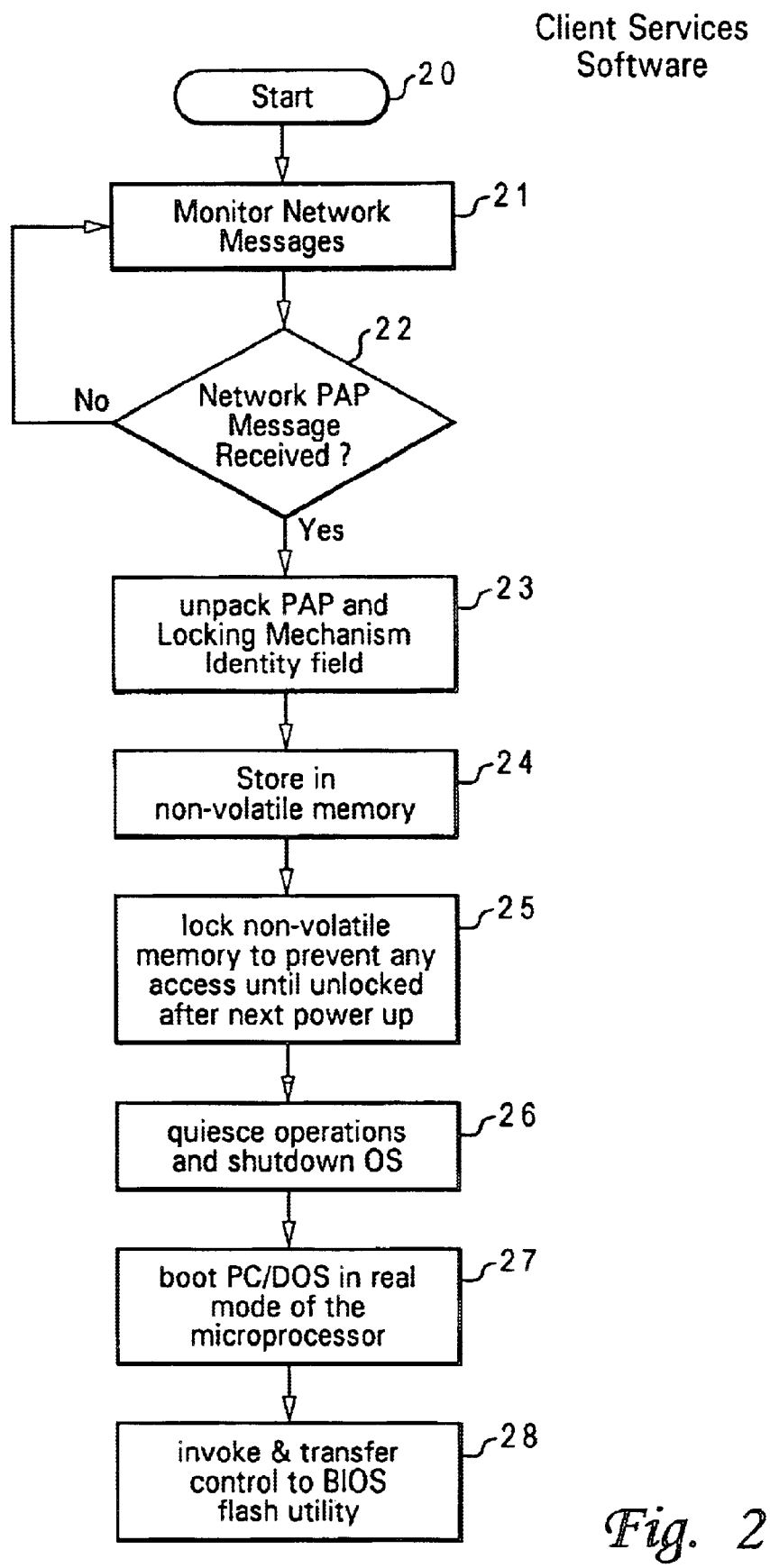
FIG. 2 is a high-level logic flow diagram of various operations performed by client services software, in accordance with a preferred embodiment of the present invention.

With reference now to FIG. 2, there is depicted a high-level logic flow diagram of various operations performed by the client services software, in accordance with a preferred embodiment of the present invention. Starting at block 20, the client services software monitors all network messages to look for those that contain a network-supplied PAP, as shown in blocks 21, 22. Once a network message that contains a network-supplied PAP is received, the client services software unpacks the network-supplied PAP and the locking mechanism no identity field from the received network message, as shown in block 23. The client services software then stores the network-supplied PAP and the locking mechanism identity field to a designated area within a non-volatile memory of a personal computer system, as depicted in block 24. Then, the client services software locks the non-volatile memory to prevent any access until a next power-up during which the non-volatile memory may be unlocked, as illustrated in block 25. The client services software subsequently invokes a trap door in the operating system that allows the current state of the personal computer system to be saved. During the transfer from the current environment to the trap door environment, the operating system ensures that all active I/O operations, such as disk writes, have been completed before the trap door is invoked, as shown in block 26. This is done so that the state of the personal computer system can be reinstated once the BIOS flash update has been performed. An operating system that actually executes in a real mode of the processor within the personal computer system, such as PC/DOS, is booted, as depicted in block 27. Once the trap door is taken, a BIOS flash utility is loaded and executed. At this point, the control is transferred to the BIOS flash utility, as illustrated in block 28.

IV. BIOS Flash Utility

Figure 3:
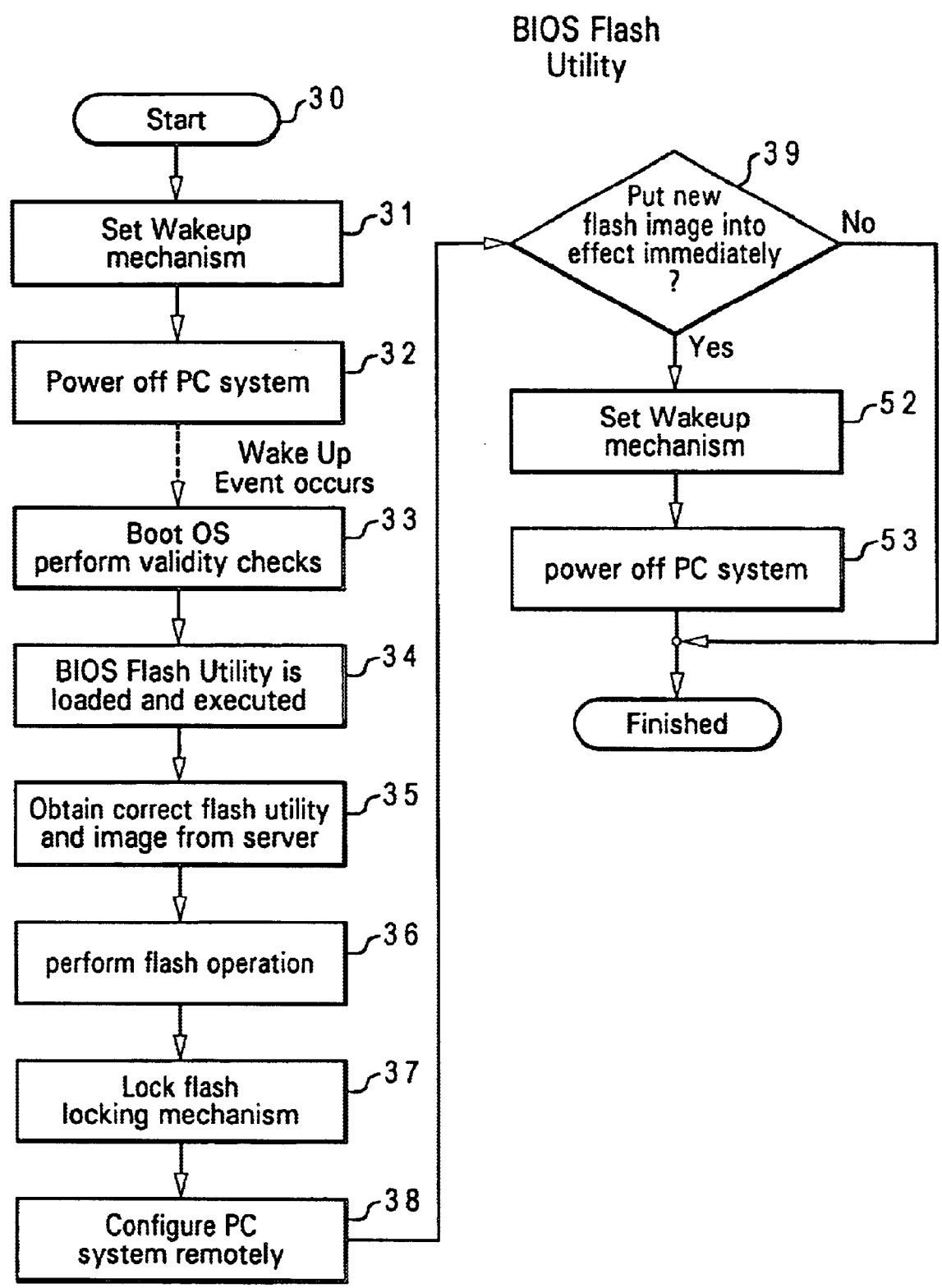
FIG. 3 is a high-level logic flow diagram of various operations performed by a BIOS flash utility, in accordance with a preferred embodiment of the present invention.

Referring now to FIG. 3, there is illustrated a high-level logic flow diagram of various operations performed by the BIOS flash utility, in accordance with a preferred embodiment of the present invention. Starting at block 30, the BIOS flash utility, using BIOS interfaces, sets up the wake-up mechanism in the personal computer system in preparation of powering off the personal computer system, as shown in block 31. For example, if the personal computer system has a wake-up mechanism on a timer, the BIOS flash utility will add a predetermined amount of time to the current time value as the wake-up time, and will write the wake-up time to the wake-up alarm using, for example, the supplied BIOS interfaces. Otherwise, if the personal computer system has a wake-up mechanism on a time interval, the BIOS flash utility will set the timer to 31 the specified time, again using, for example, the supplied BIOS interfaces. Similarly, the wake-up on ring indicate or wake-up on LAN message received mechanisms can be enabled with the supplied BIOS interfaces. The BIOS flash utility then powers off the personal computer system, using the supplied BIOS interface, as depicted in block 32.

After the personal computer system has been shut down and re-awakened, normal cold power-up procedures are then performed by POST. At this point, if POST recognizes the presence of a network-supplied PAP, POST will perform the necessary validity checks, as shown in block 33. The details of the validity checks will be further described in FIG. 4. After POST has completed the necessary validity checks, the BIOS flash utility can be downloaded to the personal computer system from the network server or can be loaded by the operating system from a local disk drive if resident, as depicted in block 34. The BIOS flash utility then requests the appropriate BIOS image for that particular personal computer system from the network server or from a local disk drive, if resident, and performs the update, as illustrated in block 35. The BIOS flash utility performs flash operation, as shown in block 36. The BIOS flash utility activates the BIOS flash protection mechanism using the supplied BIOS interface prior to instructing the personal computer system to power-off, as shown in block 37. At this point, the personal computer is ready to be remotely configured over the computer network by a network administrator, as depicted in block 38. A determination is then made as to whether or not the new flash image should be put into effect immediately, as shown in block 39. If the system owner wishes to put new flash image in effect immediately, the wake-up mechanism is enabled, as shown in block 52, and the personal computer system can be powered off, as depicted in block 53. Otherwise, if the new flash image does not need to be put into effect immediately, the process is completed.

V. Power-On Self Test (POST)

Figure 4:
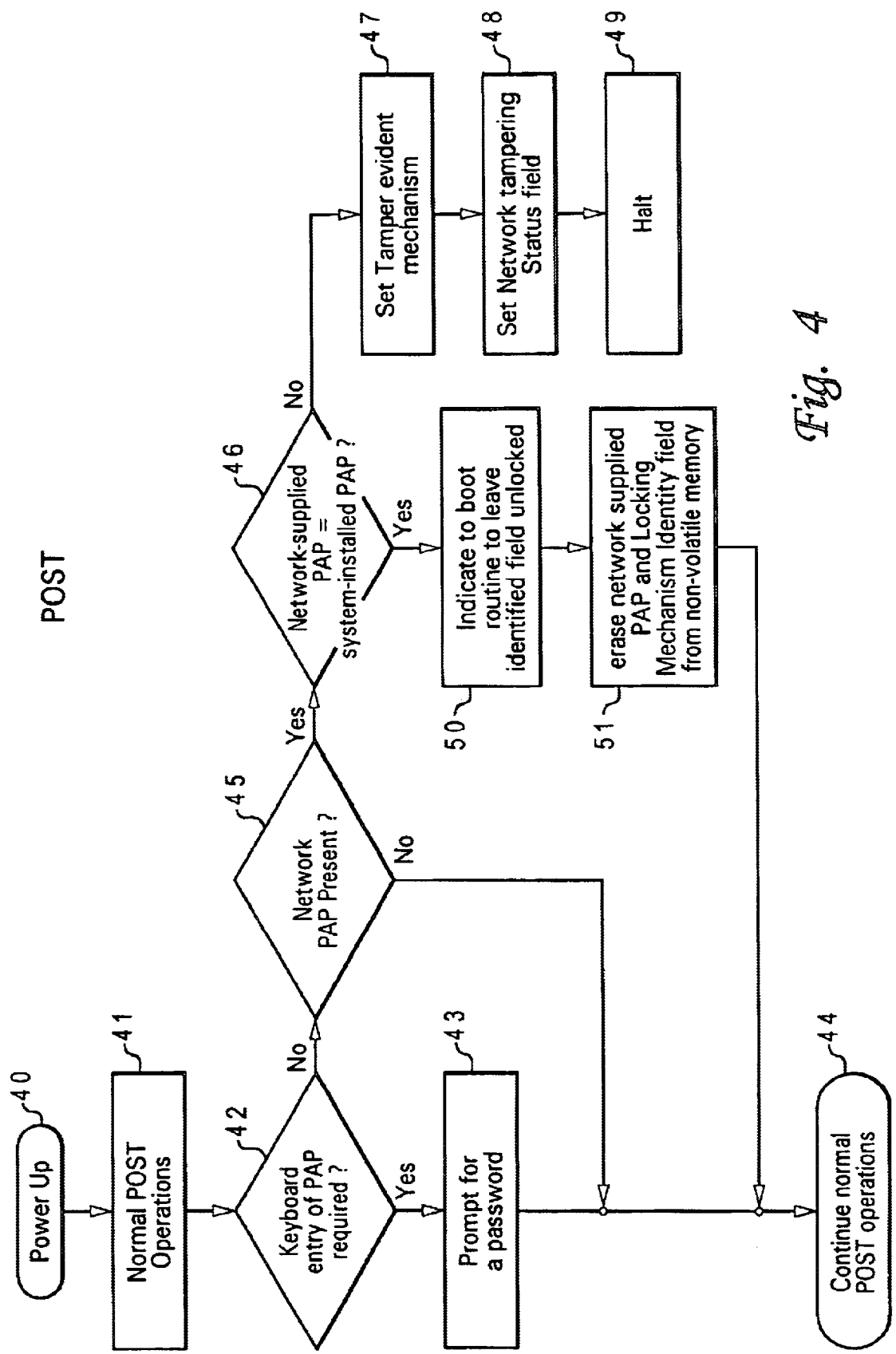
FIG. 4 is a high-level logic flow diagram of various operations performed by power-on self test (POST), in accordance with a preferred embodiment of the present invention.

POST plays an integral part in maintaining the integrity of a secured computer system. For example, a keyboard entry of the PAP is controlled by POST. POST is modified such that it can recognize the presence of a network-supplied PAP. With reference now to FIG. 4, there is illustrated a high-level logic flow diagram of various operations performed by POST, in accordance with a preferred embodiment of the present invention. After the personal computer system has been re-awakened and powered up, as shown in block 40, POST then goes through its normal cold power-up procedures, as depicted in block 41. Subsequently, a determination is made as to whether or not a keyboard entry of PAP is required, as illustrated in block 42. If a keyboard entry of PAP is required, POST prompts for a password from a user, as shown in block 43, and POST continues with its normal cold power-up procedures, as depicted in block 44. However, if a keyboard entry of PAP is not required, another determination is made as to whether or not a network-supplied PAP is presently stored in the non-volatile memory, as illustrated in block 45. If there is no network-supplied PAP presently stored in the non-volatile memory, POST again continues with its normal cold power-up procedures, as depicted in block 44. Otherwise, if there is a network-supplied PAP is presently stored in the non-volatile memory, POST then compares the network-supplied PAP with the system-installed PAP as a validity check, as shown in block 46. The system-installed PAP is preferably stored in a protected location within the non-volatile memory that is different from that of the network-supplied PAP.

If the network-supplied PAP does not match with the system-installed PAP, POST then invokes tamper evident processes, as shown in block 47. Once these processes are invoked, the network-supplied PAP and the locking mechanism identity field are erased from the non-volatile memory, and no the network tampering field is set to indicate the cause of activating of the tamper evident processes, as depicted in block 48. The tamper evident processes can also be activated by detection of other events caused by an unauthorized user. POST then halts the personal computer system and does not boot the designated operating system, as illustrated in block 49. At this point, if the personal computer is powered-off and then powered-on again, POST will prompt for keyboard entry of the PAP. POST will not allow the designated operating system to boot until the PAP is correctly entered from the keyboard.

If the network-supplied PAP matches with the system-installed PAP, POST then accesses the locking mechanism identity field and indicates to the boot routine which of the security field locking mechanisms should be left unlocked for the next boot up, as shown in block 50. POST then erases the network-supplied PAP and the locking mechanism identity field from the non-volatile memory to ensure that only this one pass through POST will leave the selected bits of the locking mechanism identity field unlocked at boot time, as depicted in block 51. POST will not boot the diskette drive as part of the boot sequence, unless the diskette drive is specifically listed in the secure IPL device list. This is to prevent booting an unknown operating system using the diskette drive when POST recognizes the mismatch between the network-supplied PAP and the system-installed PAP as the personal computer system may not be physically guarded from an unauthorized user. POST then continues with its normal cold power-up procedures, as depicted in block 44.

If POST does not find a network-supplied PAP during power-up, POST then ignores the above procedure, proceeds normally and leaves the network-supplied PAP and locking mechanism identity field unlocked at boot time. POST is also required to leave the protection mechanisms unlocked on the network-supplied PAP and the locking mechanism identity field in the non-volatile memory during any boot, whether from a power-off state or a power-on state. This is to allow the client services software to install a PAP received from the computer network. The network-supplied PAP and the locking mechanism identity field will only be locked after the entry of the PAP and the locking mechanism identity field protection mechanisms are filled in by the client services software or the network device driver.

As has been described, the present invention provides a method for providing security to a personal computer system over a computer network such that remote configuration of the personal computer system over the computer network is allowed. Although a personal computer system is used to illustrate the present invention, it is understood by those skilled in the art that the present invention can be applicable to any type of computer systems. It is also important to note that although the present invention has been described in the context of a fully functional personal computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing security to a computer on a computer network for allowing remote configuration of said computer, said method comprising the steps of:

in response to a network-supplied privileged-access password (PAP) during a boot-up operation of said computer, comparing said network-supplied PAP with a systems installed PAP;

if said network-supplied PAP does not match said system-installed PAP, setting a tamper evident mechanism within said computer;

if said network-supplied PAP matches said system-installed PAP, continue performing said boot-up operation; and after completion of said boot-up operation, allowing configuration of said computer to be performed remotely over said computer network.

2. The method according to claim 1, wherein said system-installed PAP is previously entered by a user via a keyboard associated with said computer.

3. The method according to claim 1, wherein said network-supplied PAP is supplied to said computer via a network message.

4. The method according to claim 1, wherein said method further includes a step of storing said system-installed PAP in a first location within a non-volatile memory.

5. The method according to claim 4, wherein said method further includes a step of storing said network-supplied PAP in a second location within said non-volatile memory.

6. The method according to claim 5, wherein said method further includes a step of locking said system-installed PAP and said network-supplied PAP to prevent access to said system-installed PAP and said network-supplied PAP.

7. The method according to claim 1, wherein said setting step further includes a step of halting said computer.

8. A computer system on a computer network, wherein said computer system can be configured remotely over said computer network, said computer system comprising:

means for comparing a network-supplied privileged-access password (PAP) with a system-installed PAP, in response to said network-supplied PAP during a boot-up operation of said computer system;

means for setting a tamper evident mechanism within said computer system if said network-supplied PAP does not match said system-installed PAP;

means for continuing to perform said boot-up operation if said network-supplied PAP matches said system-installed PAP; and means for allowing configuration of said computer system to be performed remotely over said computer network after completion of said boot-up operation.

9. The computer system according to claim 8, wherein said system-installed PAP is previously entered by a user via a keyboard associated with said computer.

10. The computer system according to claim 8, wherein said network-supplied PAP is supplied to said computer via a network message.

11. The computer system according to claim 8, wherein said computer system further includes a means for storing said system-installed PAP in a first location within a non-volatile memory.

12. The computer system according to claim 11, wherein said computer system further includes a means for storing said network-supplied PAP in a second location within said non-volatile memory.

13. The computer system according to claim 12, wherein said computer system further includes a locking mechanism for locking said system-installed PAP and said network-supplied PAP to prevent access to said system-installed PAP and said network-supplied PAP.

14. The computer system according to claim 8, wherein said setting means further includes a means for halting said computer system.

* * * * *